US007078829B2

(12) United States Patent
Hunninghaus et al.

(10) Patent No.: US 7,078,829 B2
(45) Date of Patent: Jul. 18, 2006

(54) SELF-POWERING INPUT BUFFER

(75) Inventors: Roy E. Hunninghaus, Des Plaines, IL (US); Joshua D. Love, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 223 days.

(21) Appl. No.: 10/856,103

(22) Filed: May 28, 2004

(65) Prior Publication Data

US 2005/0275988 A1 Dec. 15, 2005

(51) Int. Cl.
*B60R 22/00* (2006.01)

(52) U.S. Cl. ...................... 307/10.6; 307/9.1; 307/10.1

(58) Field of Classification Search ................. 307/9.1, 307/10.1, 10.6
See application file for complete search history.

(56) References Cited

U.S. PATENT DOCUMENTS 5,014,214 A 5/1991 Glowczewski et al.
5,438,678 A * 8/1995 Smith ......................... 713/300
6,249,106 B1 6/2001 Turner et al.
6,308,688 B1 10/2001 French et al.
6,614,134 B1 9/2003 Davies
6,747,880 B1 * 6/2004 Grover .................... 363/21.06
2001/0023488 A1 9/2001 Breunig et al.
2005/0029869 A1 * 2/2005 Teran et al. ............... 307/10.1

FOREIGN PATENT DOCUMENTS

EP 0 142 776 B1 5/1992

* cited by examiner

*Primary Examiner*—Robert L. DeBeradinis
(74) *Attorney, Agent, or Firm*—Brian M. Mancini

(57) ABSTRACT

A self-powering input buffer includes a first circuit leg that stores a charge, such as in a capacitor and a second circuit leg with a buffer powered by the first circuit leg that detects a state of an input with reference to a threshold. A transistor switch is coupled between the circuit legs. If the buffer detects an input voltage higher than the predetermined threshold the buffer drives the transistor switch ON to conduct current from the first circuit leg to the output. If the buffer detects an input voltage lower than the predetermined threshold the buffer drives the transistor switch OFF to disconnect the first circuit leg from the output. During a voltage dip the capacitor provides supplemental power as long as the input is above the threshold.

19 Claims, 4 Drawing Sheets

SELF-POWERING INPUT BUFFER

FIELD OF THE INVENTION

This invention in general relates to electric power supplies and, more particularly, to a self-powering input device.

BACKGROUND OF THE INVENTION

Battery line variations in a vehicular environment are quite common, and many types of circuitry must correctly operate under these conditions. This problem is no more pronounced than during the starting of a vehicle engine, wherein the starter motor typically draws the most current from the vehicle battery. In this case the load is very high, dropping the battery voltage severely. However, there are many circuits in a modem automobile that are required to operate, even under a high cranking load.

During starting there are several circuits, other than the starter circuit, that need to operate properly, even under the constraint of very low available voltage. For example, certain crank related functions such as the engine control module (ECM) and starter solenoid control must be operable during engine starting. If there is insufficient voltage available, the main module power supply for the ECM will not have sufficient voltage to operate the controller, which will cause the circuit to enter a low (input) voltage reset. Without sufficient voltage the ECM will not be operational, and the vehicle will not start.

One critical function is the control of a Power Hold Relay (PHR) that supplies power to several of these critical circuits. For example, when the PHR coil is energized and contacts closed, the PHR supplies the input power to the ECM main voltage regulator, which in turn supplies operational voltage to the main controller. The controller can also control the PHR output driver to power the PHR once the controller is operational. In operation, before starting, the vehicle controller is in a RESET state. When the ignition switch of the vehicle is first turned to the RUN position, power can be supplied directly to the output driver to the PHR coil through a dedicated line. Then after the voltage to the main supply regulator comes up, the main controller will leave the RESET mode and provide an output signal to keep the PHR output driver turned on.

In practice, during the initial phase of the starter cranking operation, when power is first applied to the starter motor, the available battery voltage can dip down to (or below) three to five volts, until the starter motor starts to turn and develop a back electromotive force (EMF). During this power dip the main supply voltage regulator typically goes into an under voltage RESET condition, turning off the main controller. As the starter motor starts to rotate, the developed motor back EMF reduces the load on the battery and allows battery voltage to return to a level where the main supply voltage regulator can work; releasing the RESET signal to the main controller.

During the initial phase of the engine cranking, during the power dip, it is not actually necessary to keep the main controller operational. All that is necessary is to provide a means to keep the PHR and Starter Motor Control Relay output driver circuits operational, while the rest of the module may be held non-operational in the RESET state. Once cranking continues battery voltage will recover enough to allow the module to leave the RESET state and drive the power and control relays directly.

Typically, vehicle manufacturers want to ensure that any such Power Hold Relay and Starter Motor Control Relay output drivers work, for some specified. period of time where the available battery voltage is below that which is normally required to engage the relays (i.e., function becomes non-operational because of relay limitations, not electronics limitations). Thus, if the supply/battery voltage drops to a level below which the PHR stays engaged, the power to operate the PHR output driver needs to come from the ignition switch RUN position input.

Moreover, complications arise with supply/battery voltage transients, particularly during cold weather engine cranking, wherein the PHR output driver is still required to operate during these transients. Further complications arise in some additional manufacturer requirements such as where: a) the Power Hold Relay and Starter Motor Control Relay output driver circuits need to be self-protecting; since the main controller is not always operational when these outputs are active, wherein output driver protection is not allowed to be a fold back protection scheme, even with automatic retry; b) it is required that the "Power Hold Relay" output driver circuit be capable of turning OFF within a specified period of time after the ignition RUN Position switch opens (i.e. the main controller is not running or not running in the hold ON mode) and/or after the main controller relay hold output signal is removed; and c) the ignition RUN Position switch input also needs to provide a logical input signal to a main controller, and potentially to one or two other secondary controllers in the module. It would be desirable (but not always possible) that the input threshold voltage for turning ON the relay driver output is also the same threshold voltage used to signal the controllers that the switch is open or closed.

Engine control modules with delayed Power Hold Relay functions and circuits are not new. However, as additional requirements are placed on the operation of the PHR function, and in view of the complications that can arise, new and unique solutions are required.

FIG. 1 shows a basic circuit for supply voltage during low battery voltage conditions. This solution typically depends on a large charge storage capacitor to store charge for those times when there is insufficient battery voltage. Such charge storage capacitor is charged up just prior to the cold cranking supply/battery voltage dip. Specifically, a B+ supply from a battery for example (e.g. 12 volts) is connected from the ignition switch RUN position through a forward-biased blocking diode D1. During operation, B+ supplies power to an output, coupled to the PHR output driver, for example. A high power zener diode D2, and an electrolytic storage capacitor C1 are connected in parallel, in a shunt configuration, between the B+ line and the output. Other devices (not shown) can also be included as are known in the art for current limiting, etc.

This circuit supplies voltage during low B+ conditions by storing charge in the electrolytic capacitor C1. Capacitor C1 must be large enough to supply sufficient voltage during starter cranking until starter EMF drives battery voltage recovery. This may be several hundred milliseconds, which requires a large capacity, resulting in the requirement for a physically large capacitor with a high cost. Moreover, the total voltage available with a single capacitor is limited to no more than the B+ supply. In addition, this circuit does not address any of the complications that can arise.

Another solution is to charge a capacitor to a voltage greater than the supply voltage by a voltage step-up or "boost switcher" power supply, which can utilize. smaller capacitors with a higher voltage rating. Typical step-up circuits include a charge pump circuit and a voltage regulating and current limiting circuit, as are known in the art. In this case, power from the ignition RUN Position switch would initially turn the PHR driver circuit ON and once the boost supply is up and operational, the running (not in reset) main controller circuits can be used to keep the driver output ON during the battery supply dip phase of the cold cranking operation.

However, having to use a boost switcher power supply to meet these simple requirements is excessively cost prohibitive. Additionally, if the PHR should drop out (during the initial cranking voltage dip) the switching supply can drop out and could take tens of milliseconds to reestablish its operation after the PHR contacts close again, potentially resulting in a "relay chattering" non-operational mode. In addition, this solution does not meet the requirement of the relay output driver circuit staying ON, even when the contacts of the relay open.

Another possible solution is to use a diode powered "OR" circuit to the input pin of a relay "smart" output driver circuit. This configuration uses one of the diode inputs connected to the ignition RUN Position switch and another input diode connected to a controller hold signal output pin.

Typical "smart" self-protected output driver ICs derive their operational power from the voltage at their input pin. However the required voltage at the input pin (worst case high) of such a "smart" driver, plus one diode drop, is typically above that which may be available during a cold crank supply/battery dip. Therefore, capacitors need to be added, after the RUN Position input diode, to hold the output driver on during a supply/battery dip. However, the capacitors can also be charged by the micro controller output, resulting in too long of a delay time from when the micro controller output goes low to when the relay output driver turns OFF. Therefore, more diodes are needed, which now are required to be low-drop Shottkey diodes with reverse leakage current concerns. Further, resistors are needed to obtain added protection of the "smart" output driver and for discharging the charge storage capacitors to limit maximum time until turn OFF. All of these solutions needlessly add cost to provide the added protections required.

Therefore, it is desirable to provide a simpler, less problematic circuit approach that overcomes most, if not all, of the preceding problems. It would also be beneficial if a technique could be provided such circuit in a low cost configuration.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention provides a self-powered, charge storage input buffer circuit that is operable to power starting circuits, such as a Power Hold Relay circuit among others, in a simple, low-cost configuration. The input buffer circuit provides power for itself and a power module during low battery voltage conditions (e.g. cold cranking of the starter). In addition, the present invention provides means to survive a variety of high voltage and reverse voltage transients. Moreover, the switching characteristics of the circuit are unchanged. Further, the only voltage source needed for operation is from the ignition RUN Position switch. The present invention is capable of supplying a voltage which is higher than that of an input buffer decision threshold as will be described below.

Figure 1:
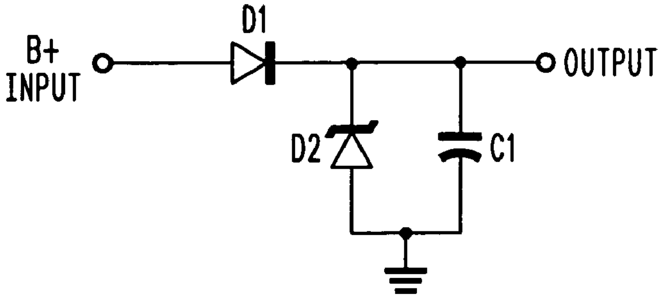
FIG. 1 shows a schematic diagram of a prior art charge storage circuit.
Figure 2:
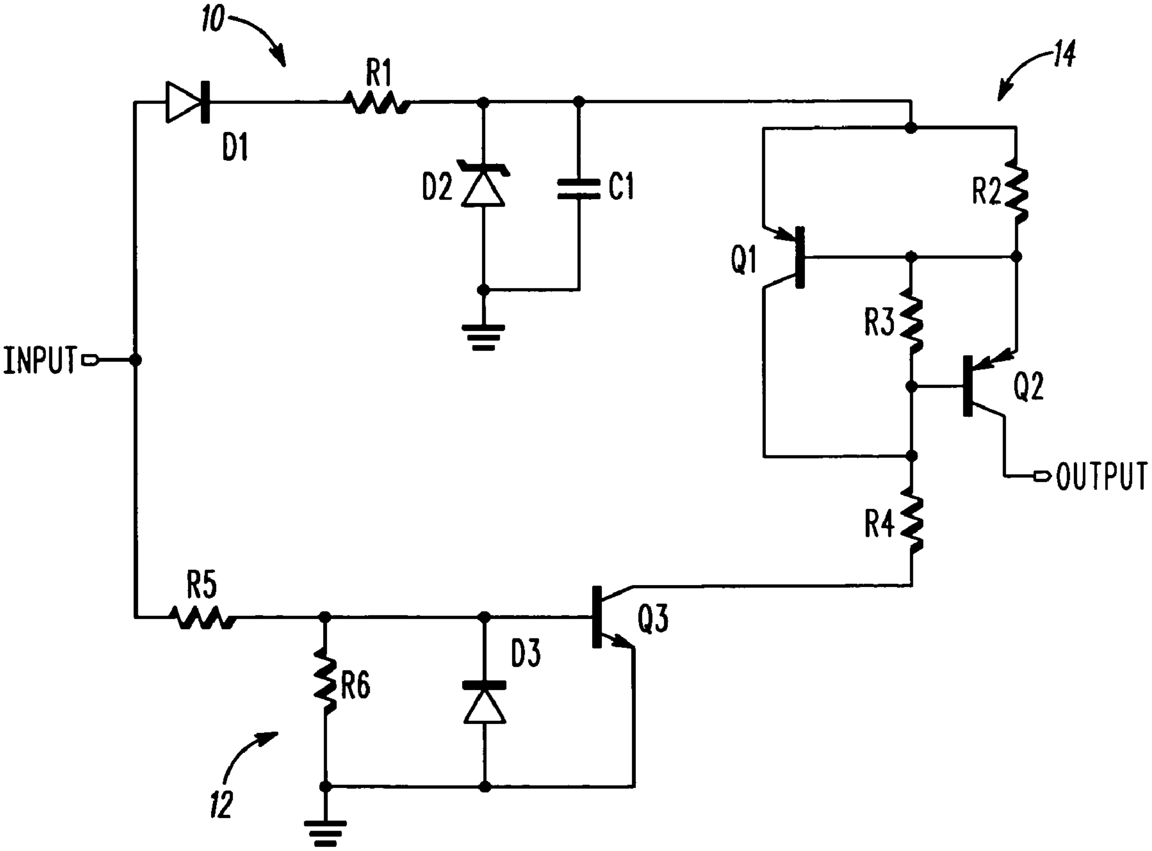
FIG. 2 shows a simplified schematic diagram of a self-powering input buffer, in accordance with the present invention.
Figure 3:
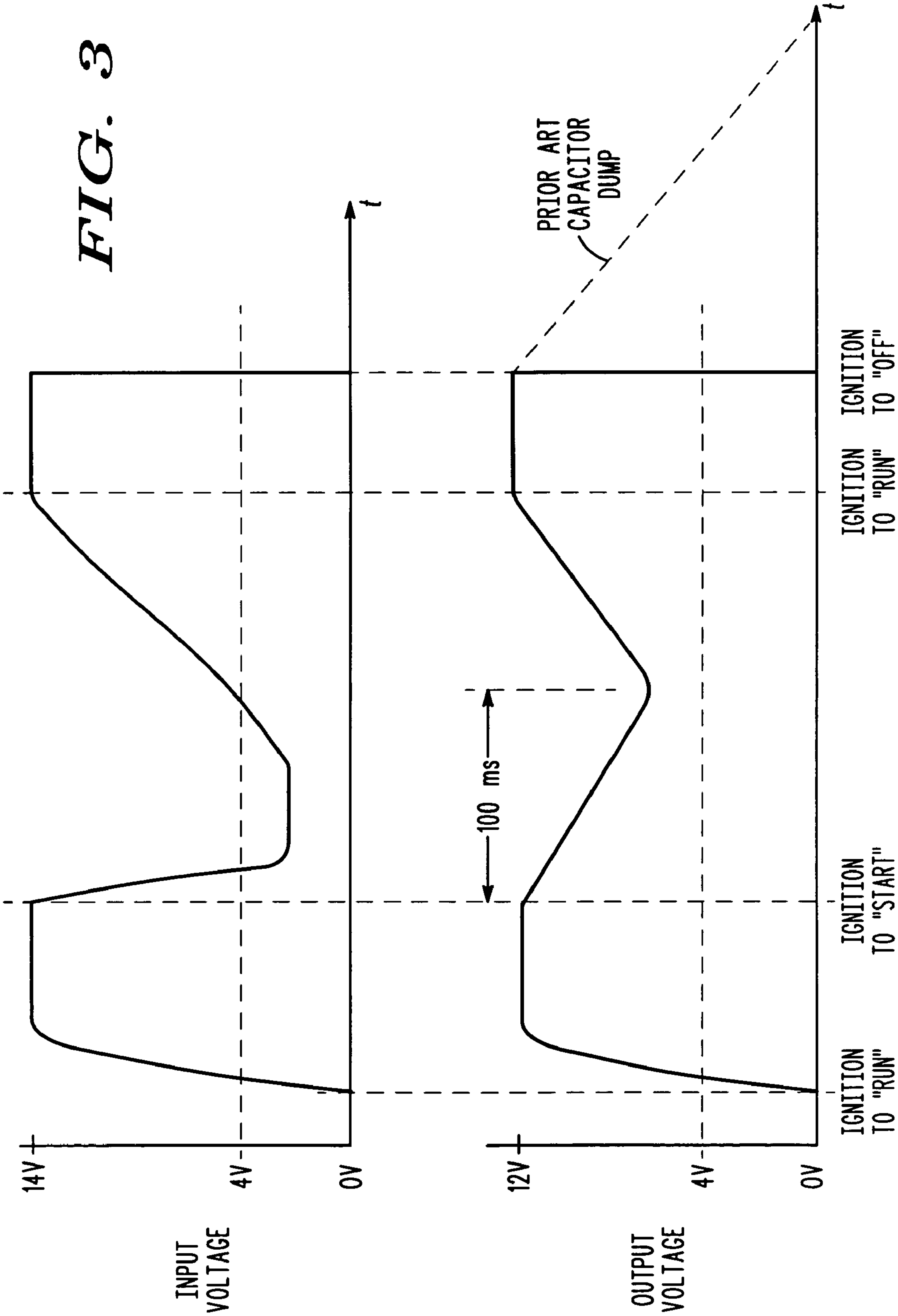
FIG. 3 is a graphical representation of the input and output voltage from the input buffer of FIG. 2.

Referring to FIGS. 2 and 3, a self-powering input buffer is shown in accordance with the present invention. The circuit includes an input and an output. The input is configured for connection to a vehicle battery through an ignition switch. Specifically, the input is connected to a RUN position of a vehicle ignition switch, which is itself directly connected to a vehicle battery. The output drives one or more power starting circuits, such as a Power Hold Relay (PHR) for example, necessary for starting the vehicle. The output provides power to these starting circuits during the cold cranking operation of the vehicle, where the battery voltage dips to a level that may be insufficient to power the starting circuit directly. It is only necessary to supply power to the starting circuits for a short time (e.g. 100 ms) until the back electromotive force from the starter lets the battery voltage recover. Once recovered, the PHR and other circuits can be powered from their normal sources.

A first circuit leg 10 coupled to the input stores a charge to provide the supplemental power during the initial phase of the crank operation for use when the input supply/battery voltage dips severely. Specifically, a charge storage capacitor, C1, is provided to store charge. As the ignition switched is turned on to the RUN position, but before reaching the START position, the charge storage capacitor is quickly charged up. Specifically, the vehicle battery (e.g. 12V) is connected from the ignition switch RUN position through a forward-biased blocking diode D1. A high power zener diode D2, and the storage capacitor C1 are connected in parallel, in a shunt configuration. The storage capacitor C1 is charged to about the battery voltage (e.g. 12V) upon application of power thereto. In-rush current is limited by resistor R1, which also has an associated voltage drop. As the ignition switch is moved to START, the starter motor is initially engaged and power from the input drops severely, and the capacitor C1 serves to temporarily supply power to the output.

A second circuit leg 12 is also coupled to the input. The second circuit leg including a buffer transistor Q3 that detects a state of the input with reference to a predetermined threshold defined by the resistor divider R5, R6 and the base-emitter drop across the forward biased transistor Q3. In effect, the NPN buffer transistor Q3 is used to read the state of the ignition RUN position switch. Diode D3 serves to protect against the accidental application of a reverse polarity to the input buffer. The first circuit leg 10 operates to power the buffer of the second circuit leg 12 through a high-side transistor switch 14. No other voltage source is used than that available from the ignition switch in RUN position.

The transistor switch 14 is coupled between the circuit legs 10, 12 and the output. Transistor switch 14 provides power to the output. The second circuit leg 12 is not separately powered, but is powered through the first circuit leg 10. In operation, the transistor switch 14 is switched by the buffer transistor Q3. When the ignition switch to the input is turned to RUN, buffer transistor Q3 detects an input voltage higher than the predetermined threshold and turns ON, grounding the input of the transistor switch 14 which has input power applied to its high side from the first circuit leg. The resistor divider R3 and R4 bias the PNP transistor Q2 ON, which feeds input current from the first circuit leg to the output.

High current through transistor Q2 causes voltage to rise across the base of transistor Q1. Q1 turning ON starves the base drive to transistor Q2 and limits Q2 current. The bulk of transistor Q2 collection current flows through resistor R2 producing a voltage. When the R2 voltage exceeds the base-emitter voltage of Q 1, Q1 turns ON. R4 limits the current that flows from the collector of Q1 plus the base of Q2 (i.e. transistor Q1 collector plus transistor Q2 base equals transistor Q3 collector). As Q1 turns ON and supplies current, less current is taken from the base of Q2, thus reducing the Q2 collector current ($Ic=I_{62}$*gain) and reducing the current through R2, and reducing the voltage across the base-emitter of Q1.

Output current is supplied to the output pin as long as the input voltage is above the threshold voltage of the buffer transistor Q3, even if the input voltage is well below the standard operating voltage. For example, the resistor divider R5 and R6 can be chosen such the buffer transistor Q3 turns on at three volts, well below the standard twelve volt operating voltage. Output current can be supplied by the input pin or the capacitor C1. Capacitor C1 supplies power if the input voltage dips below the voltage from the charge stored in the charge storage capacitor but above the predetermined threshold of the transistor buffer Q3. In this low input voltage case, the buffer transistor still drives the transistor switch 14 ON to conduct current from the charge storage capacitor C1 of the first circuit leg 10 to the output. The charge storage capacitor has a sufficient capacity to provide at least a nominal output voltage (e.g. three volts) for a period of time (e.g. 100 ms) during powering of the starter circuit until the battery voltage recovers to the nominal output voltage.

Once the buffer transistor detects an input voltage lower than the predetermined threshold (i.e. the ignition is turned OFF) the transistor buffer Q3 drives the transistor switch 14 OFF to disconnect the first circuit leg 10 from the output, without requiring the discharge of the capacitor C1. This is an important distinction over the prior art, as it is not necessary to wait for the discharge of the capacitor C1, since it is disconnected from the circuit when the ignition is turned OFF.

By using the two circuit leg approach of the present invention, the output of the buffer is capable of supplying a voltage (during a supply/battery dip) to a power circuit that is higher than that of the buffer transistor (Q3) decision threshold voltage. This is important since the voltage input necessary to energize existing power relay drivers must compensate for two diode drops, with an IR drop across the input current limiting resistor, which is well in excess of where it is desired to have the decision threshold of the input buffer transistor of the second circuit leg. For example, today's power relays require about eight volts at the input to be energized and about four volts to hold on. The present invention provides proper energization using a three voltage switching threshold. Moreover, this is accomplished with no externally applied voltages and uses only one decision threshold.

Advantageously, the present invention provides the distinctions of: a) the output can remain ON for a period of time after the input voltage falls below the level initially necessary to cause the output to turn ON, as long as the input voltage stays above the decision voltage threshold level of the (logic) input buffer stage; and b) immediately upon the input voltage falling below the decision voltage threshold level the buffer output turns OFF; without the need of immediately discharging the charge storage capacitor.

Figure 4:
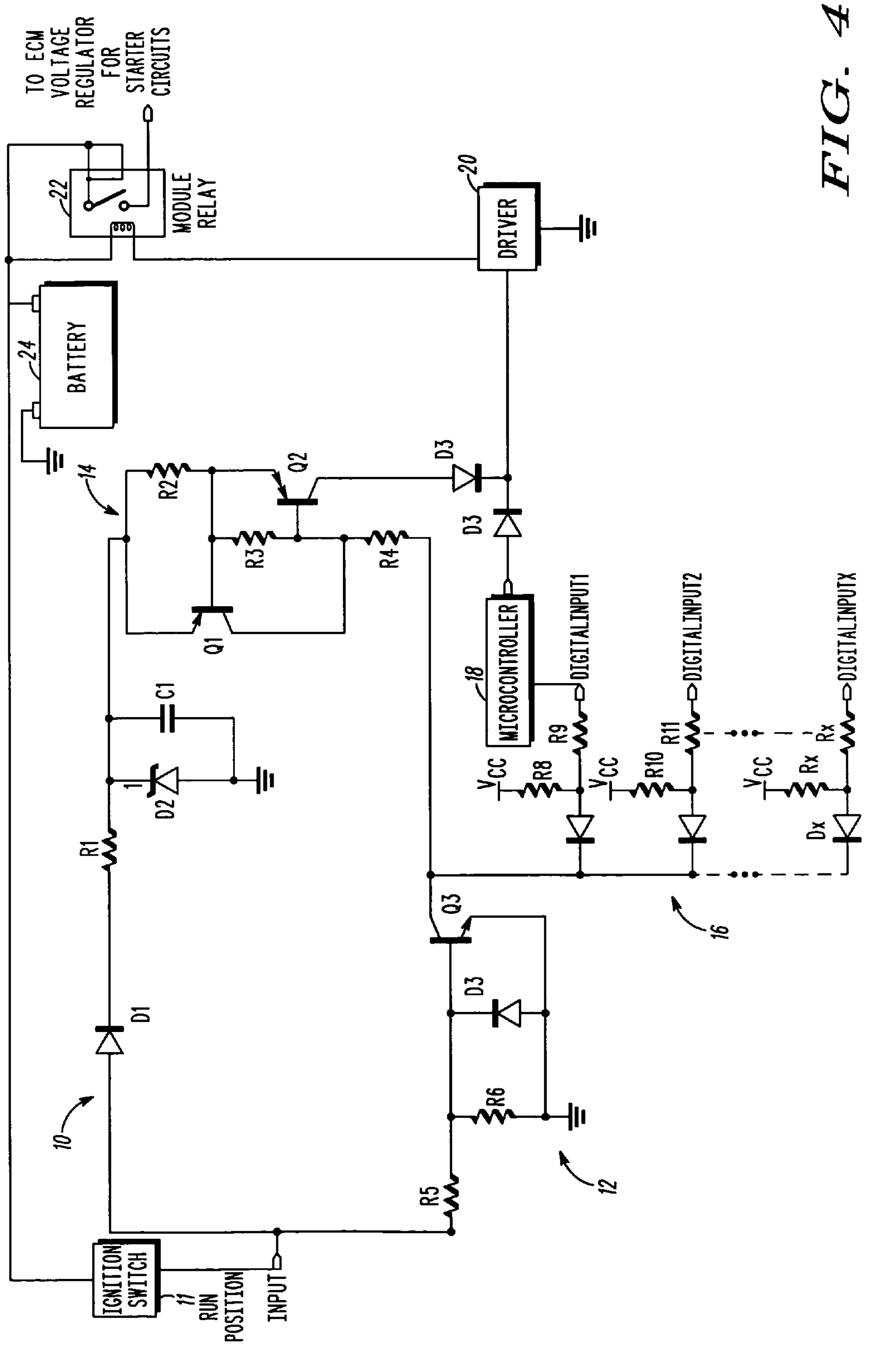
FIG. 4 shows a simplified schematic diagram of an application a self-powering input buffer, in accordance with the present invention.

FIG. 4 provides more detail of the application of the input buffer of the present invention associated with starting circuits of a vehicle. The presence of the ignition RUN position detection function of the second circuit leg 12 can be used to advantage with a plurality of non-starter related power circuits 16 with associated inputs, wherein the buffer Q3 of the second circuit leg is coupled to control the plurality of logic circuits through a connection to the associated inputs.

Note the simplicity of adding additional buffer logic outputs to serve as inputs to several different controllers' inputs. An additional requirement on such fanned out logic signals is that a fault at the input of one of the micro inputs should not corrupt the integrity of the input reading at any of the other micro inputs and/or the PHR. As can be seen, the basic structure of the present invention easily allows for this requirement to be met.

For example, when transistor Q3 is OFF, current will not flow out of the cathode of Dx, and Rx pulls the node high to a logic "1" (a logic inversion of the key switch being OFF). When transistor Q3 is ON, current flows through the Dx diodes and the node is pulled low to logic "0" (i.e. key switch ON). As a result, if the input of one of the secondary micros is shunted low, a false low signal will not be seen on any of the other secondary micro inputs (or turn on the PHR).

One of the plurality of circuits can be a main electronic control unit microprocessor 18. As detailed above, the driver 20 for the PHR 22 can be supplied by either the controller 18 or the novel input buffer of the present invention through either of the OR'ed diodes D3. The driver can be a smart low-side switch with current limiting or a dumb transistor FET switch. Alternatively, the coil could be driven directly without the driver. The power relay 22 is coupled through it s driver 20 to the output and to the controller. The power relay 22 is held in an energized state by the output when the ignition switch is first switched to a RUN position and held in an energized state by the controller 18 after the controller is powered. The input buffer stays ON after the engine is started, not to power the driver, but only to provide a key state to the controller such that the microcontroller knows when the key switch is turned to OFF.

The present invention can use a lower tolerance charge storage capacitor than in the prior art since there is no need to discharge the capacitor when the driver turns the key switch OFF, i.e. there is less concern about the charge drop out times. In addition, the current limit function of the high-side switch helps reduce current draw for the output to only that which is needed. In other words, the charge storage capacitor requires less excess charge than in the prior art.

Figure 5:
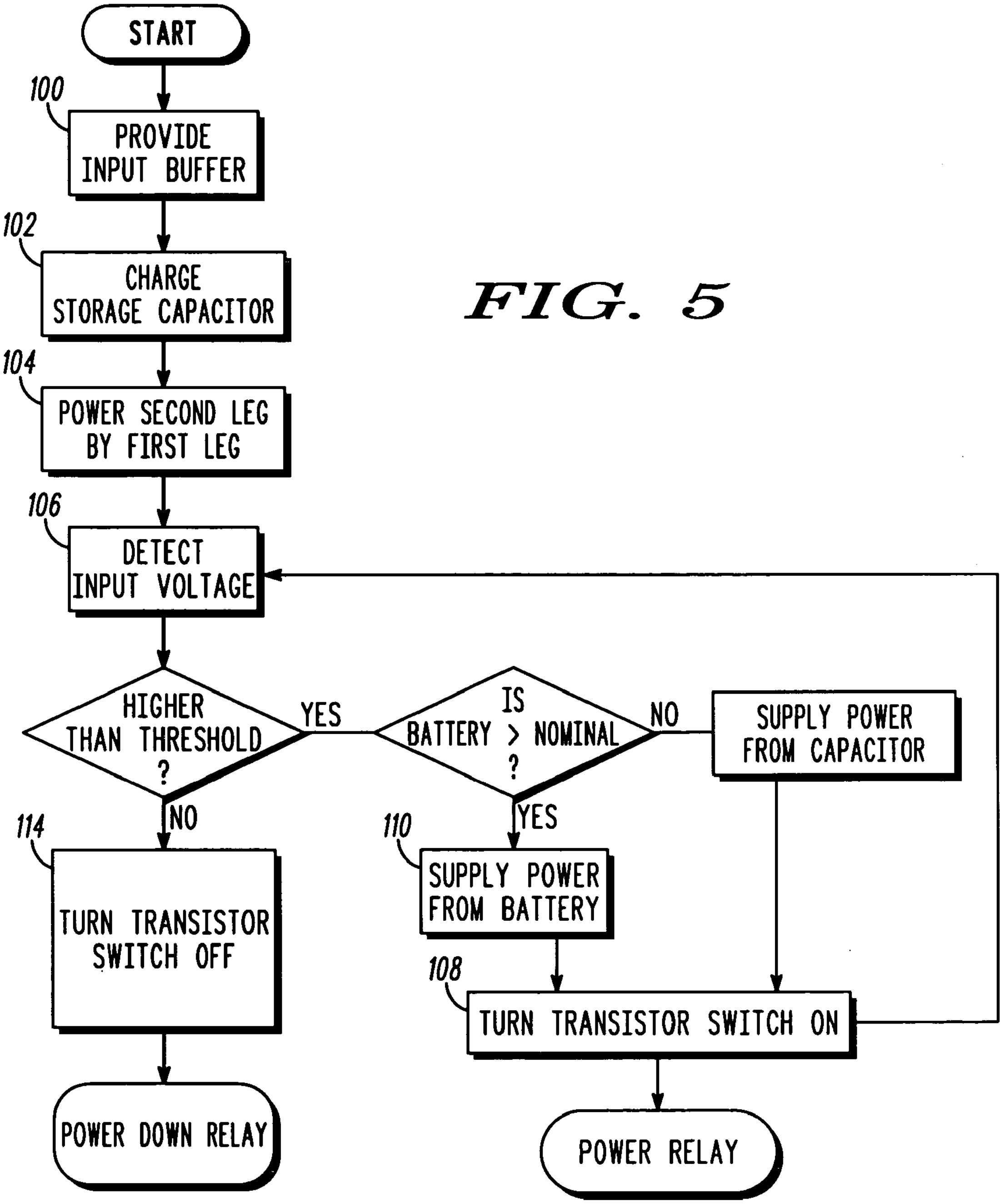
FIG. 5 is a flow chart showing a method for powering starting circuits, in accordance with the present invention.

Referring to FIGS. 4 and 5, the present invention also incorporates a method for providing power from a vehicle battery 24 to a vehicle starting circuit through an ignition switch 11. The method includes a first step 100 of providing a self-powering input buffer between the starting circuit 20, 22 and the ignition switch 11. The input buffer includes a first circuit leg 10 with a charge storage capacitor C1 and a second circuit leg 12 including a buffer transistor Q3 that detects a state of the input with reference to a predetermined threshold. A transistor switch 14 controlled by the buffer drives the starting circuit 20, 22 by having the PHR turn ON to power the ECM voltage regulators. The charge storage capacitor is provided with sufficient capacity to provide at least a nominal output voltage for a period of time during the driving step 108 until the battery voltage recovers above the nominal output voltage. Preferably, this step 100 includes providing a controller 18, and a power relay 22 coupled to the input buffer and to the controller 18. The driving step 108 includes holding the power relay 22 in an energized state when the ignition switch is first switched to a RUN position and holding the power relay 22 in an energized state by the controller 18 after the controller is powered.

A next step includes charging 102 the charge storage capacitor C1 with an input voltage.

A next step includes powering 104 the second circuit leg 12 by the first circuit leg 10.

A next step includes detecting 106 an input voltage from the RUN position of the ignition switch 11. At this point the input voltage can be higher than or equal to a predetermined threshold defined by the resistor divider R5 and R6, or less than or equal to the predetermined threshold.

A next step includes driving 108 the transistor switch ON to conduct current from the first circuit leg 10 to the starting circuit 20, 22 when the input voltage is higher than the predetermined threshold. Current can be supplied 110 directly from the battery 24 to the starting circuit if the battery can supply a nominal voltage. Otherwise, current can be supplied 112 to the starting circuit by the capacitor C1 if the battery voltage falls below a nominal voltage, as long as the buffer Q3 detect an input voltage greater than the predetermined threshold. Preferably, this step 108 can be used to drive a plurality of power circuits with associated inputs.

A next step includes driving 114 the transistor switch OFF to disconnect the first circuit leg 10 from the starting circuit 20, 22 when the input voltage is lower than the predetermined threshold.

It should be recognized that although bipolar power transistors are used throughout the examples of the present invention, any type of power handling device or switch can be used equally well. For example, Field Effect Transistors (FETs) of various configurations could be substituted.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A self-powering input buffer comprising:

an input and an output;

a first circuit leg that stores a charge, the first circuit leg being coupled to the input;

a second circuit leg coupled to the input, the second circuit leg including a buffer that detects a state of the input with reference to a predetermined threshold; and a transistor switch coupled between the circuit legs and the output, wherein if the buffer detects an input voltage higher than the predetermined threshold the buffer drives the transistor switch ON to conduct current from the first circuit leg to the output, and if the buffer detects an input voltage lower than the predetermined threshold the buffer drives the transistor switch OFF to disconnect the first circuit leg from the output.

2. The input buffer of claim 1, wherein the first circuit leg includes a charge storage capacitor, wherein if the input voltage dips below a voltage from the charge stored in the charge storage capacitor but above the predetermined threshold of the buffer of the second circuit leg, the buffer drives the transistor switch ON to conduct current from the charge storage capacitor of the first circuit leg to the output.

3. The input buffer of claim 1, wherein the first circuit leg includes a charge storage capacitor that is charged with an input voltage upon application of power thereto.

4. The input buffer of claim 1, wherein first circuit leg operates to power the buffer of the second circuit leg.

5. The input buffer of claim 1, wherein the input is coupled to a vehicle battery that operates to power a circuit of a vehicle, and wherein the first circuit leg includes a charge storage capacitor with a sufficient capacity to provide at least a nominal output voltage for a period of time during powering of the circuit until the battery voltage recovers to the nominal output voltage.

6. The input buffer of claim 1, wherein the input is coupled to a vehicle battery through an ignition switch, and further comprising:

a controller; and a power relay coupled to the output and to the controller, and wherein the power relay is held in an energized state by the output when the ignition switch is first switched to a RUN position and held in an energized state by the controller after the controller is powered.

7. The input buffer of claim 6, wherein the voltage required to energize the power relay is higher than the predetermined threshold of the buffer of the second circuit leg.

8. The input buffer of claim 1, further comprising a plurality of logic circuits with associated inputs, wherein the buffer of the second circuit leg is coupled to control the plurality of logic circuits through a connection to the associated inputs.

9. A self-powering input buffer for a vehicle starter circuit, the input buffer comprising:

an input and an output, the input configured for connection to a vehicle battery through an ignition switch;

a first circuit leg that stores a charge in a charge storage capacitor, the first circuit leg being coupled to the input, the charge storage capacitor is charged with an input voltage upon application of power thereto;

a second circuit leg coupled to the input, the second circuit leg including a buffer that detects a state of the input with reference to a predetermined threshold, the first circuit leg operates to power the buffer of the second circuit leg; and a transistor switch coupled between the circuit legs and the output, wherein if the buffer detects an input voltage higher than the predetermined threshold the buffer drives the transistor switch ON to conduct current from the first circuit leg to the output, and if the buffer detects an input voltage lower than the predetermined threshold the buffer drives the transistor switch OFF to disconnect the first circuit leg from the output.

10. The input buffer of claim 9, wherein if the input voltage dips below a voltage from the charge stored in the charge storage capacitor but above the predetermined threshold of the buffer of the second circuit leg, the buffer drives the transistor switch ON to conduct current from the charge storage capacitor of the first circuit leg to the output.

11. The input buffer of claim 9, wherein the charge storage capacitor has a sufficient capacity to provide at least a nominal output voltage for a period of time during powering of the starter circuit until the battery voltage recovers to the nominal output voltage.

12. The input buffer of claim 9, further comprising:

a controller; and a power relay coupled to the output and to the controller, and wherein the power relay is held in an energized state by the output when the ignition switch is first switched to a RUN position and held in an energized state by the controller after the controller is powered.

13. The input buffer of claim 12, wherein the voltage required to energize the power relay is higher than the predetermined threshold of the buffer of the second circuit leg.

14. The input buffer of claim 9, further comprising a plurality of logic circuits with associated inputs, wherein the buffer of the second circuit leg is coupled to control the plurality of logic circuits through a connection to the associated inputs.

15. A method for providing power from a vehicle battery to a vehicle starting circuit using an ignition switch, the method comprising the steps of:

providing a self-powering input buffer between the starting circuit and the ignition switch, the input buffer including a first circuit leg with a charge storage capacitor and a second circuit leg including a buffer that detects a state of the input with reference to a predetermined threshold, and a transistor switch controlled by the buffer to drive the starting circuit;

charging the charge storage capacitor with an input voltage;

powering the second circuit leg by the first circuit leg;

detecting an input voltage;

driving the transistor switch ON to conduct current from the first circuit leg to the starting circuit when the input voltage is higher than the predetermined threshold;

driving the transistor switch OFF to disconnect the first circuit leg from the starting circuit when the input voltage is lower than the predetermined threshold.

16. The method of claim 15, wherein the driving the transistor switch ON step includes supplying current from the capacitor to the starting circuit if the battery voltage falls below a nominal voltage.

17. The methods of claim 15, wherein the providing step includes providing the charge storage capacitor with sufficient capacity to provide at least a nominal output voltage for a period of time during the driving the transistor switch ON ’step until the battery voltage recovers above the nominal output voltage.

18. The method of claim 15, wherein the providing step includes providing a controller, and a power relay coupled to the input buffer and to the controller, and wherein the driving the transistor switch ON step includes holding the power relay in an energized state when the ignition switch is first switched to a RUN position and holding the power relay in an energized state by the controller after the controller is powered.

19. The method of claim 15, wherein the driving the transistor switch ON step includes driving a plurality of logic circuits with associated inputs.

* * * * *